（12）United States Patent
Buttery et al.

(10) Patent No.: US 8,595,943 B2
(45) Date of Patent: Dec. 3, 2013

(54) TORQUE-LIMITED CHAIN TENSIONING FOR POWER TOOLS

(75) Inventors: Jeremy L. Buttery, Tempe, AZ (US); Robert M. Shymkus, Bowling Green, KY (US); Delbert E. Lucas, Bowling Green, KY (US); Robert Atchley, Bowling Green, KY (US)

(73) Assignee: MTD Products Inc, Valley City, OH (US)

( * ) Notice: Subject to any disclaimer, the term of this patent is extended or adjusted under 35 U.S.C. 154(b) by 253 days.

(21) Appl. No.: 12/737,271

(22) PCT Filed: Jun. 24, 2009

(86) PCT No.: PCT/US2009/003758
§ 371 (c)(1),
(2), (4) Date: Mar. 31, 2011

(87) PCT Pub. No.: WO2010/005485
PCT Pub. Date: Jan. 14, 2010

(65) Prior Publication Data
US 2011/0167650 A1    Jul. 14, 2011

Related U.S. Application Data

(60) Provisional application No. 61/132,890, filed on Jun. 24, 2008.

(51) Int. Cl.
*B27B 17/00*    (2006.01)
*B27B 17/14*    (2006.01)

(52) U.S. Cl.
USPC .................................. 30/381; 30/383; 30/386

(58) Field of Classification Search
USPC ............................................ 30/381, 383, 386
See application file for complete search history.

(56) References Cited

U.S. PATENT DOCUMENTS

| 2,754,438 A | | 7/1956 | Zozulin et al. | |
| 3,636,995 A | * | 1/1972 | Newman | ......................... 30/386 |
| 4,129,943 A | * | 12/1978 | Bricker | ......................... 30/386 |

(Continued)

FOREIGN PATENT DOCUMENTS

| CA | 2729341 A1 | * | 1/2010 |
| CH | 319336 | | 2/1957 |

(Continued)

*Primary Examiner* — Jason Daniel Prone
(74) *Attorney, Agent, or Firm* — Wegman, Hessler & Vanderburg

(57) ABSTRACT

A chainsaw (100) has a chainsaw body (101), a cutting chain (103) driven by a motor, and a guide bar mounting stud (111) extending from the chainsaw body (101). The chainsaw (100) also has an adjustably connected guide bar (102) having a track for supporting the cutting chain (103) around a periphery of the guide bar (102) and an adjustment pin (114) extending from a side face thereof. The guide bar mounting stud (111) is configured to extend through an elongated slot (112) in the guide bar (102). The chainsaw (100) also has a cam (116) received on the guide bar mounting stud (111) and having an eccentric groove facing the guide bar (102). The adjustment pin (114) is received in the eccentric groove such that rotation of the cam (116) causes the guide bar (102) to move with respect to the chainsaw body (101), thereby tensioning the cutting chain (103). The chainsaw (100) also has a clutch (118) connected to the cam (116) for allowing no more than a predetermined load to be applied to the guide bar (102) for tensioning the cutting chain (103).

11 Claims, 9 Drawing Sheets

(56) References Cited

U.S. PATENT DOCUMENTS

| | | | |
|---|---|---|---|
| 4,687,082 A | 8/1987 | Lenfeldt | |
| 5,144,751 A * | 9/1992 | Weber | 30/386 |
| 5,345,686 A * | 9/1994 | Zimmermann | 30/386 |
| 5,353,506 A * | 10/1994 | Muller et al. | 30/386 |
| 5,491,899 A * | 2/1996 | Schliemann et al. | 30/386 |
| 5,528,835 A | 6/1996 | Ra | |
| 5,896,670 A | 4/1999 | Gibson et al. | |
| 6,049,986 A * | 4/2000 | Calkins et al. | 30/386 |
| 6,200,220 B1 | 3/2001 | Drew | |
| 6,345,447 B1 * | 2/2002 | Ronkko | 30/386 |
| 6,532,671 B1 * | 3/2003 | Jong | 30/386 |
| 6,560,879 B2 * | 5/2003 | Franke et al. | 30/386 |
| 6,564,459 B1 * | 5/2003 | Steinbrueck et al. | 30/386 |
| 6,782,627 B2 * | 8/2004 | Hermes et al. | 30/386 |
| 6,877,233 B1 * | 4/2005 | Franke | 30/386 |
| 7,107,689 B2 * | 9/2006 | Keeton et al. | 30/386 |
| 7,350,301 B2 * | 4/2008 | Chung Lee | 30/386 |
| 7,434,502 B2 * | 10/2008 | Keeton et al. | 30/386 |
| 7,600,323 B2 * | 10/2009 | Sugishita | 30/386 |
| 8,365,420 B2 * | 2/2013 | Pellenc | 30/386 |
| 2002/0124421 A1 * | 9/2002 | Hermes et al. | 30/386 |
| 2003/0196294 A1 | 10/2003 | Conrad | |
| 2006/0207111 A1 * | 9/2006 | Sugishita | 30/386 |
| 2009/0007439 A1 * | 1/2009 | Sugishita | 30/386 |
| 2011/0314682 A1 * | 12/2011 | Maag et al. | 30/386 |

FOREIGN PATENT DOCUMENTS

| | | |
|---|---|---|
| DE | 623303 | 12/1935 |
| DE | 947394 | 8/1956 |
| DE | 1075903 B | 2/1960 |
| DE | 4220845 A1 * | 1/1994 |
| DE | 102005034614 A1 | 2/2007 |
| EP | 2036688 A2 | 3/2009 |
| GB | 661643 | 11/1951 |
| GB | 2403686 A | 1/2005 |
| JP | 2008012780 A | 1/2008 |
| JP | 2008049529 A | 3/2008 |
| WO | WO 2010005485 A1 * | 1/2010 |

* cited by examiner

TORQUE-LIMITED CHAIN TENSIONING FOR POWER TOOLS

CROSS-REFERENCE TO RELATED APPLICATION

This application claims the priority benefit of U.S. Provisional Patent Application Ser. No. 61/132,890 filed Jun. 24, 2008.

TECHNICAL FIELD

The present disclosure generally relates to the field of chain tensioning for power tools, and more particularly to a torque-limiting chain tensioning device for a chainsaw.

SUMMARY OF THE INVENTION

The present disclosure is directed to a device for reducing the range of chain tension created when a user replaces or re-tensions a chain. Providing load limited tension brings the chain up to a specified tension and then maintains that tension during the clamping of the bar. This configuration may also provide a solid surface that relies more on solid material interaction rather than coefficients of friction and normal force generation.

In one embodiment, the invention is directed to a chainsaw powered by a motor housed by a chainsaw body. The chainsaw includes a cutting chain connected so as to be driven by the motor, and a guide bar mounting stud extending from the chainsaw body. The chainsaw also has an adjustably connected guide bar. The guide bar has a track for supporting the cutting chain around a periphery of the guide bar, an adjustment pin extending from a side face thereof, and an elongated slot formed therein, wherein the guide bar mounting stud is configured to extend through said slot in the guide bar. The chainsaw also has a cam received on the guide bar mounting stud and having an eccentric groove facing the guide bar. The adjustment pin is received in the eccentric groove such that rotation of the cam causes the guide bar to be positioned along its longitudinal dimension with respect to the chainsaw body, thereby tensioning the cutting chain. The chainsaw also has a clutch connected to the cam for allowing no more than a predetermined load to be applied to the guide bar for tensioning the cutting chain.

In one embodiment, the clutch includes a wrap spring between the knob and the cam to limit the amount of tension which may be supplied to the cutting chain. In another embodiment, the clutch includes a first series of magnets, and the cam includes a generally opposed second series of magnets, wherein the first and second series of magnets hold the cam in relation to the clutch until sufficient force is created such that the magnetic forces between the first and second series of magnets are no longer great enough to prevent a slip between the clutch and the cam, thereby limiting the torque that the cam can apply. In yet another embodiment, the clutch includes a ring gear connected to one of the clutch and the cam, and one or more flexible fingers comprising a center gear connected to the other of the clutch or the cam.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The structure, operation, and advantages of the presently disclosed embodiment of the invention will become apparent when consideration of the following description taken in conjunction with the accompanying drawings wherein.

Corresponding reference characters indicate corresponding parts throughout the views of the drawings.

DETAILED DESCRIPTION OF EXEMPLARY EMBODIMENTS

Reference will now be made in detail to the subject matter disclosed, which is illustrated in the accompanying drawings.

Figure 1:
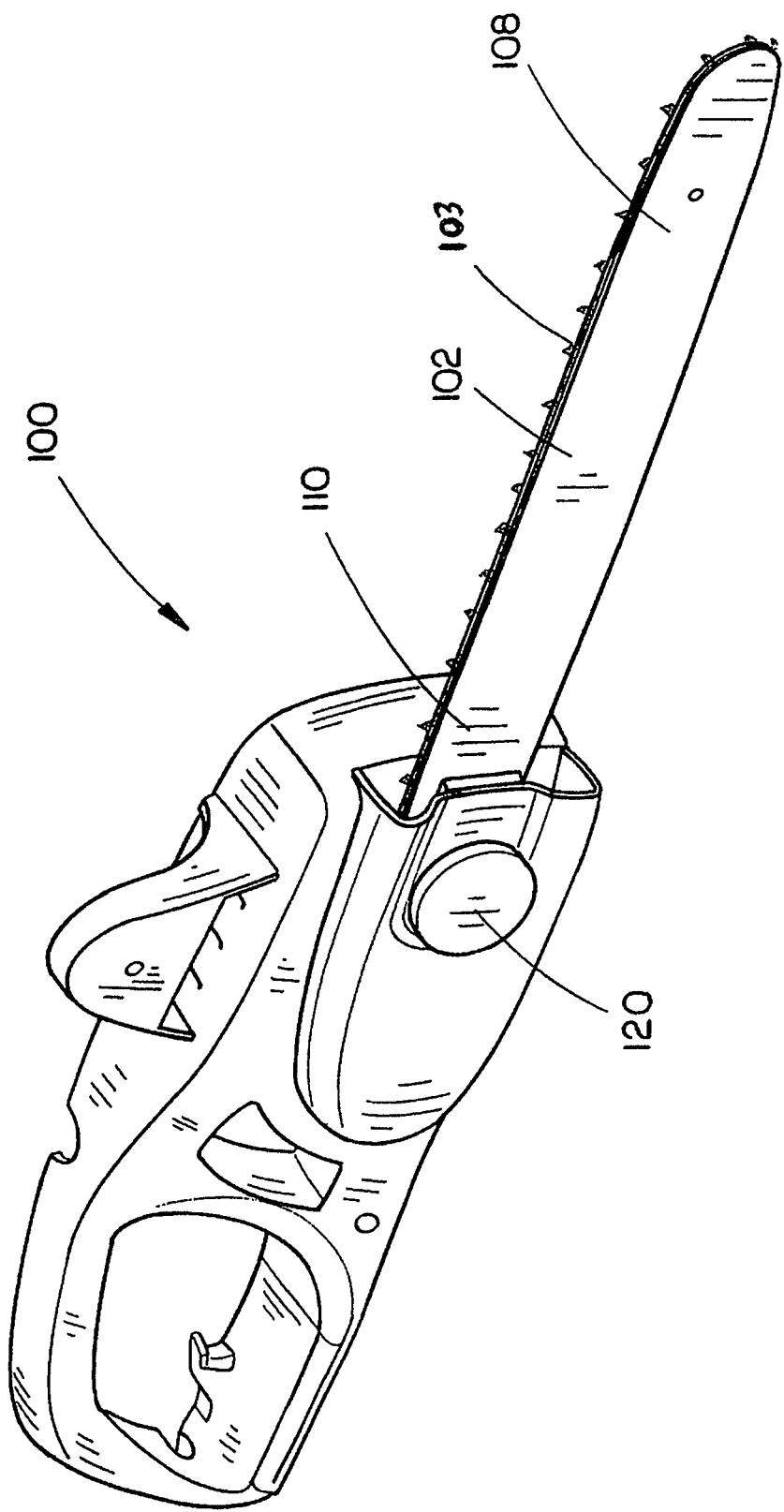
FIG. 1 is an isometric view illustrating a chainsaw.
Figure 2:
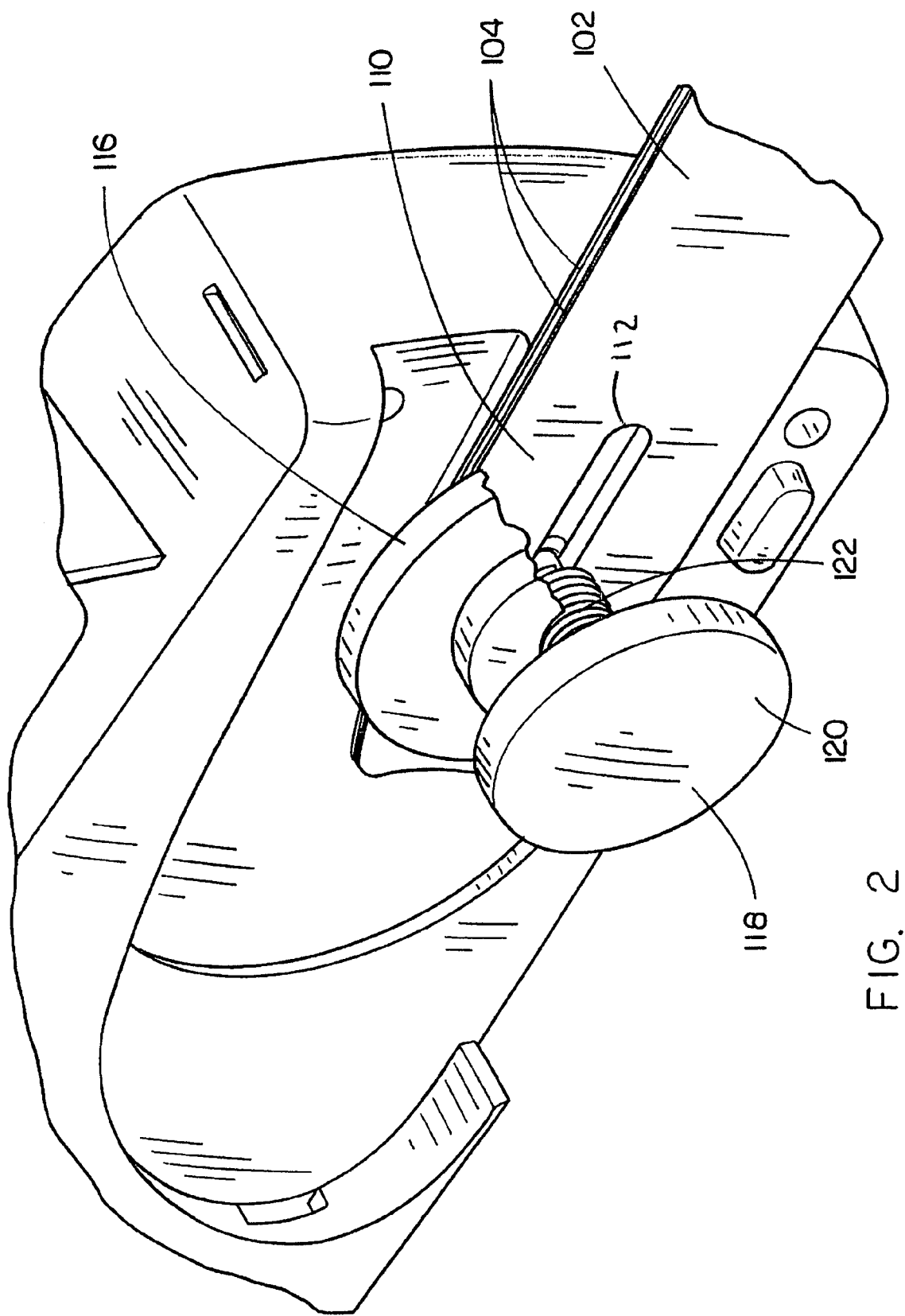
FIG. 2 is a partial cutaway isometric view of the chainsaw illustrated in FIG. 1.
Figure 3:
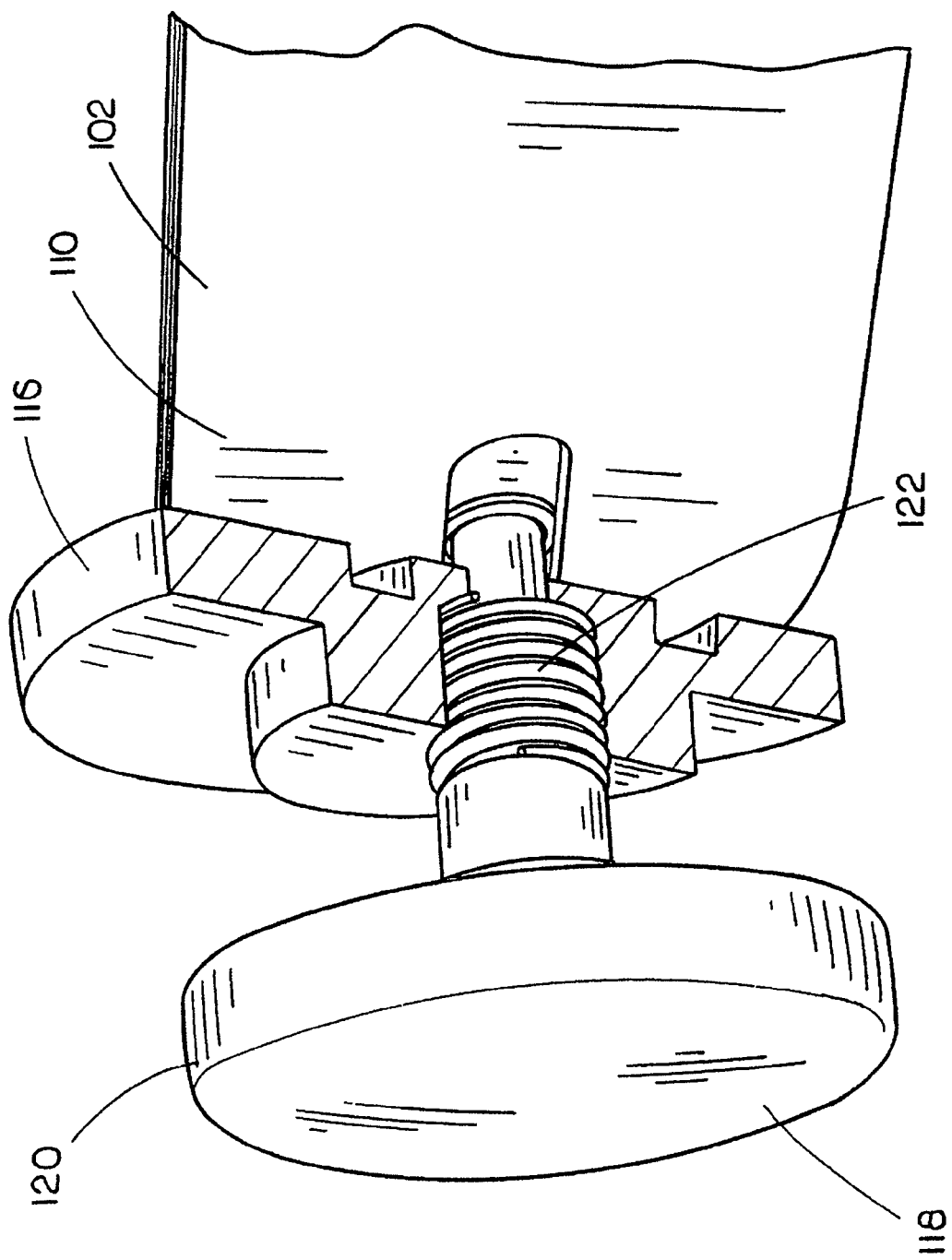
FIG. 3 is a partial cross-sectional isometric view of a guide bar, a cam, and a clutch for the chainsaw illustrated in FIG. 1.
Figure 4:
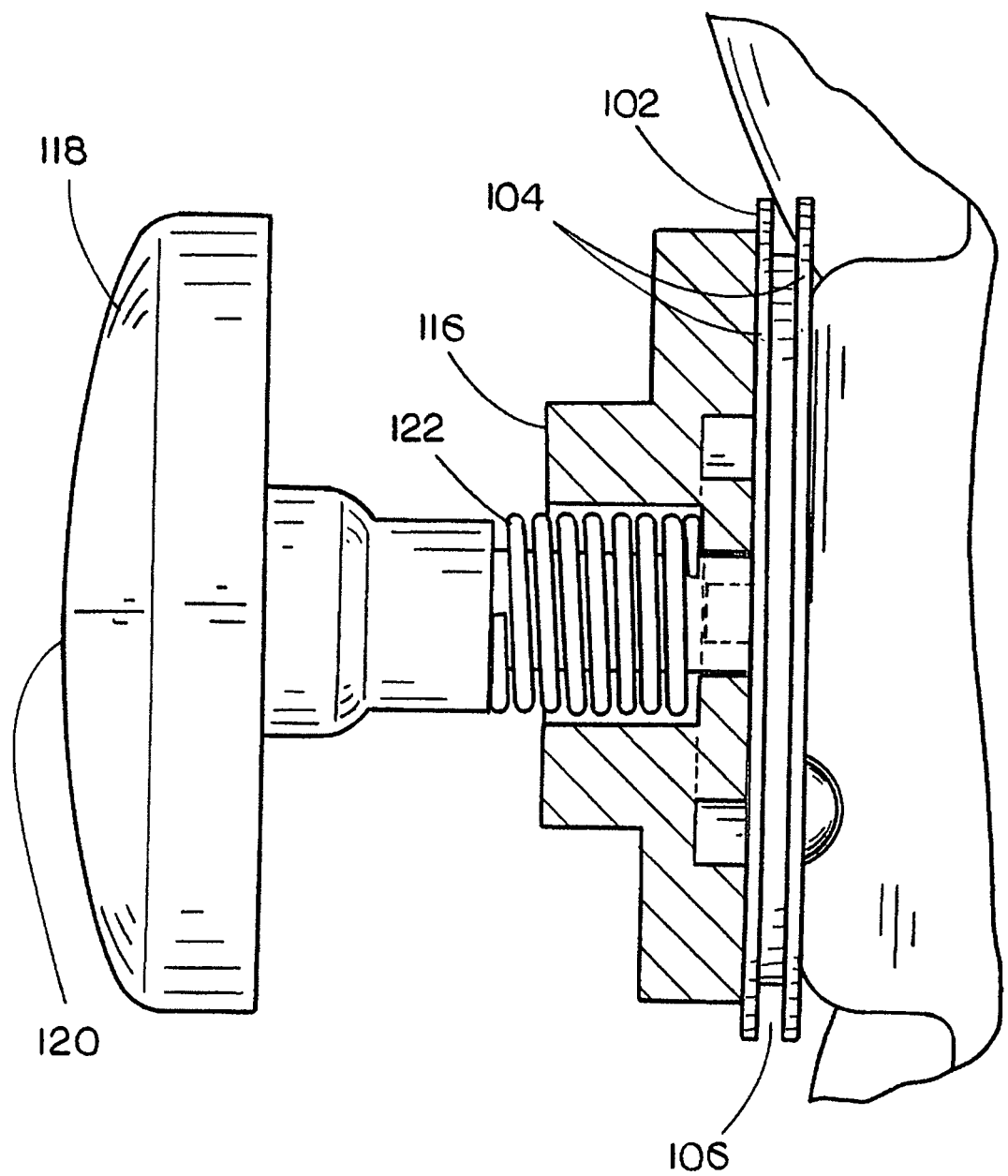
FIG. 4 is a cross-sectional end elevation view of the guide bar, the cam, and the clutch illustrated in FIG. 3.
Figure 5:
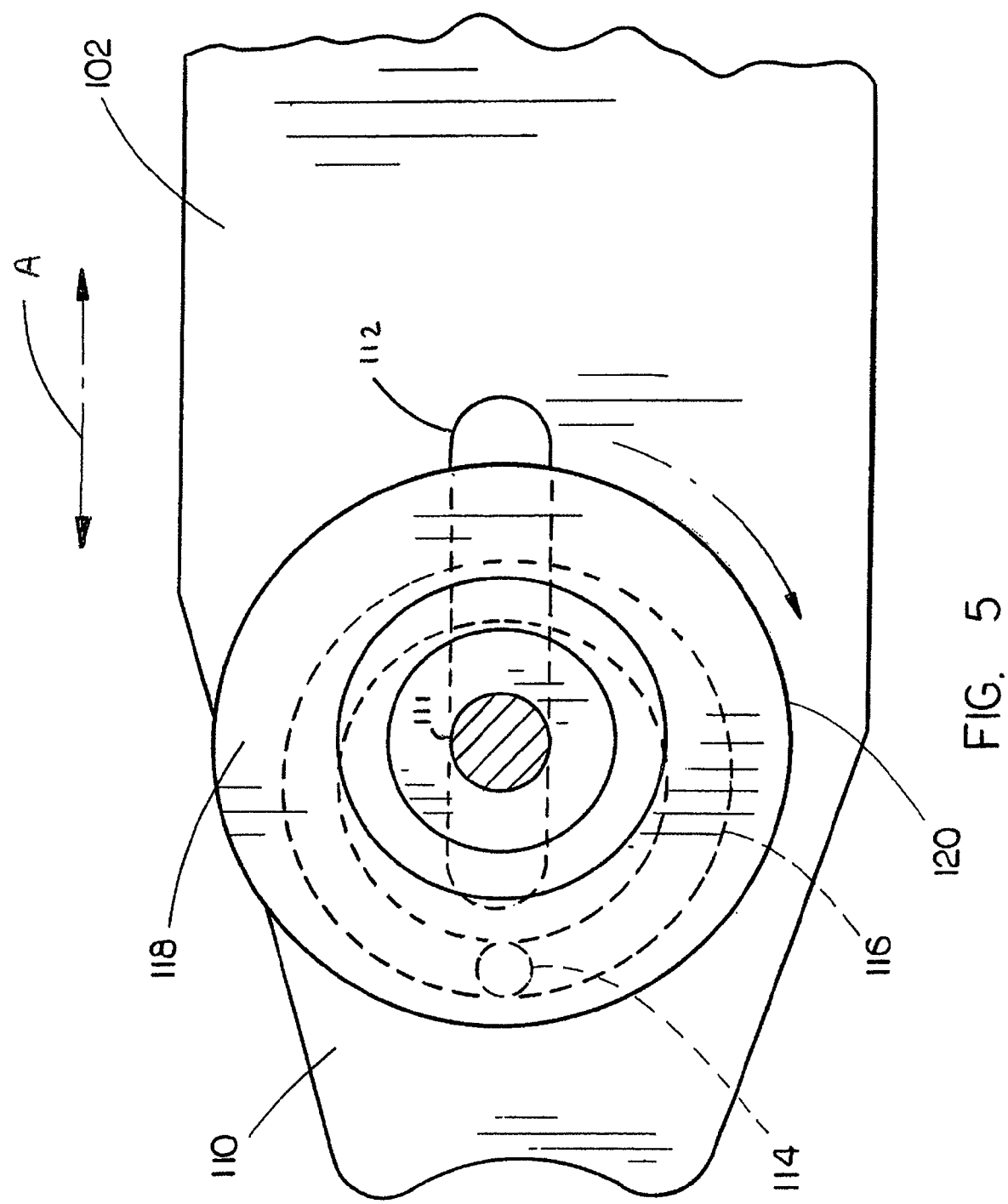
FIG. 5 is a partial side elevation view of the guide bar and the cam illustrated in FIG. 3.
Figure 6:
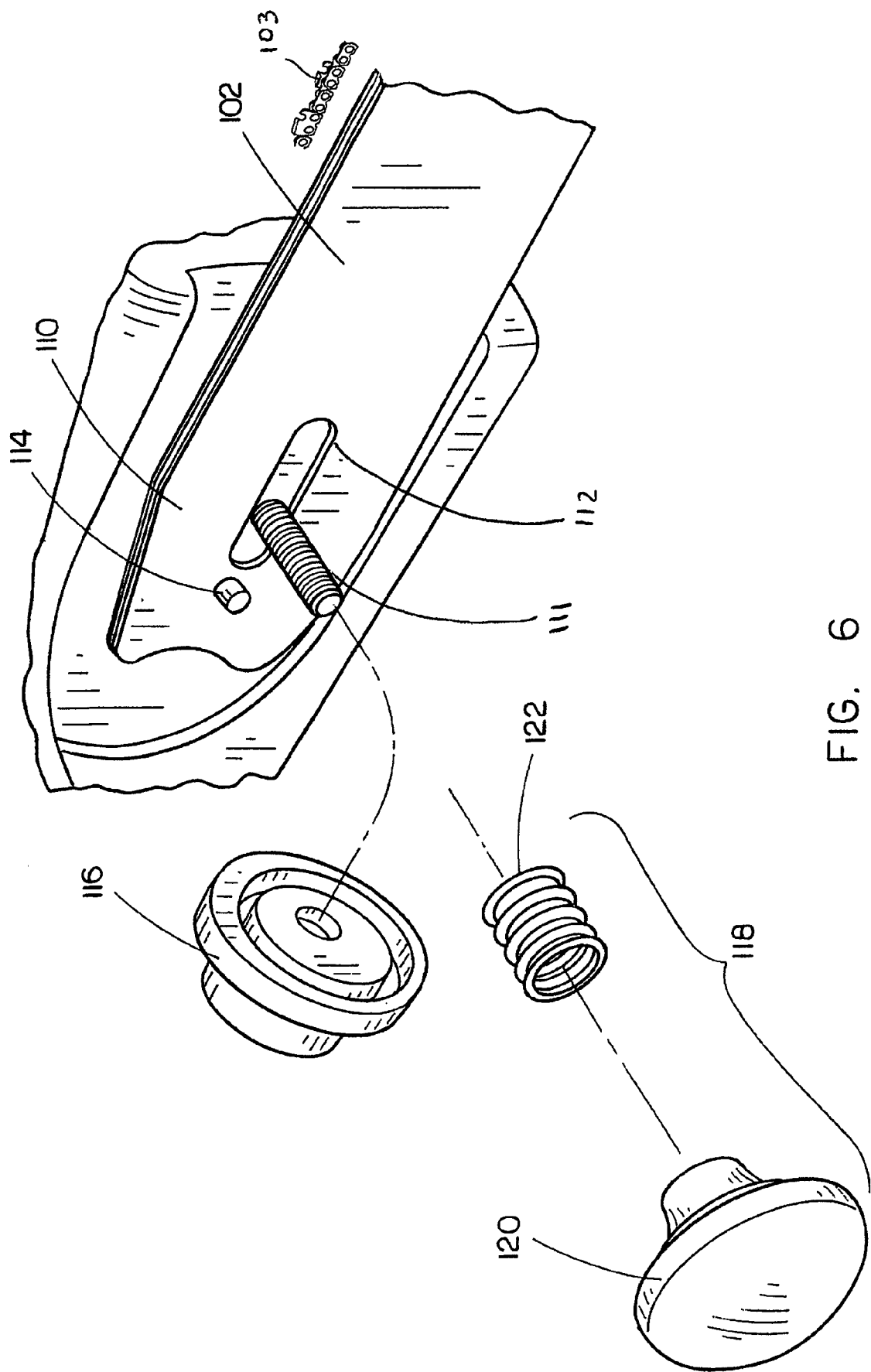
FIG. 6 is a partial exploded isometric view of the guide bar, the cam, and the clutch illustrated in FIG. 3.

Referring generally to FIGS. 1 through 6, a chainsaw 100 is illustrated in accordance with one exemplary embodiment of the present disclosure. The chainsaw 100 has a body 101 which incorporates a conventional motor and a guide bar 102 for supporting a cutting chain 103. The guide bar 102 comprises a longitudinal frame having two flat sides, one of the flat sides facing towards the body 101 and the other one of the flat sides facing away from the body. The guide bar 102 has rails 104 for keeping the cutting chain 103 centered on a track 106 extending around the periphery of the guide bar 102. The cutting chain 103 is supported by the guide bar 102 at a first end 108 of the guide bar 102, and is connected to and driven by a chain-drive output proximal to a second end 110 of the guide bar 102, such as an engine's drive sprocket inside the body 101 of the chainsaw 100. As best seen in FIGS. 5 and 6, the guide bar 102 is mounted to the body 101 on stud 111 that extends from the body 101. The guide bar 102 has a slot 112 that has a width that corresponds closely to the diameter of the stud 111. While the positions of the stud 111 and the drive sprocket are fixed with relation to the body 101 of the chainsaw 100, the guide bar 102 may be adjusted along its longitudinal dimension as shown by the arrow A in FIG. 5 with relation to the body 101 of the chainsaw 100.

As best seen in FIG. 6, the guide bar 102 includes an adjustment pin 114 fixedly connected to the guide bar 102 for tensioning the cutting chain 103. The adjustment pin 114 is connected to a cam 116, and the cam 116 is connected to a clutch 118. In one embodiment, the cam 116 is received on and rotates about the axis of the stud 111. The cam 116 has an eccentric groove 119 that receives the adjustment pin 114. The clutch 118 is configured to allow a predetermined load to be applied to the guide bar 102 via the adjustment pin 114. The predetermined load is set by the design of the clutch 118. For example, the clutch 118 may include a knob 120 mounted on the stud 111, driven by a user. While there is not a sufficient reaction force from the tension of the cutting chain 103, the cam 116 will turn, and the sliding of the adjustment pin 114 in the eccentric groove 119 drives the guide bar 102 forward (i.e., in a direction away from the body 101 of the chainsaw 100 proximal to the second end 110 of the guide bar 102).

Once sufficient tension exists in the cutting chain 103, the clutch 118 will begin slipping and prevent the cutting chain 103 from being tensioned further. Thus, components of the clutch 118 can be selected to prevent the chain 103 from being over tensioned. The knob 120 will continue to turn while the clutch 118 slips to clamp the guide bar 102 down against the mounting surfaces of the power head of the chainsaw 100. Further, the configuration of the chainsaw 100, including the adjustment pin 114 and the cam 116, may hold the guide bar 102 and prevent it from rotating about guide bar mounts.

Figure 7:
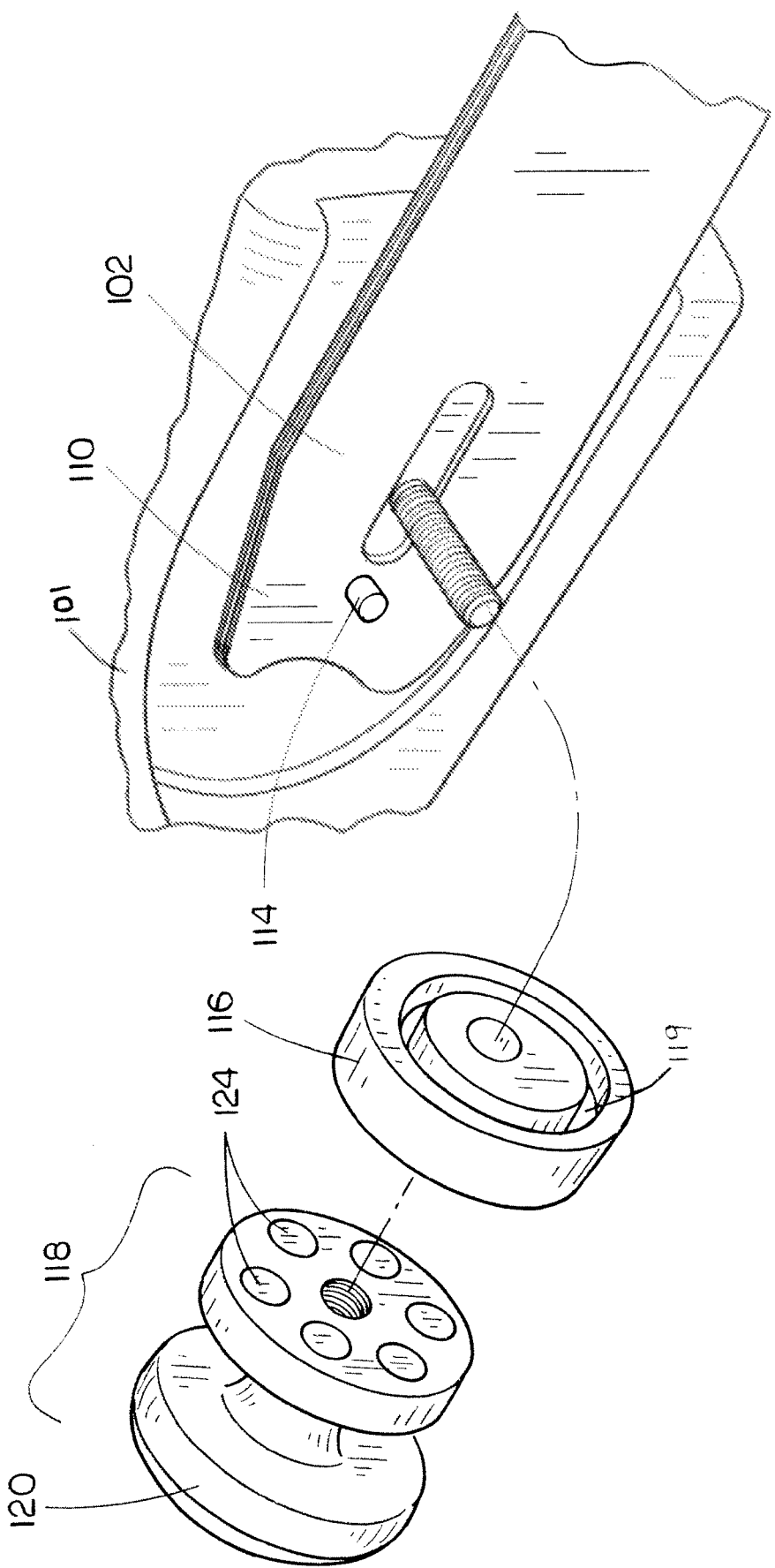
FIG. 7 is a partial exploded isometric view of a guide bar, a cam, and a clutch for another chainsaw.
Figure 8:
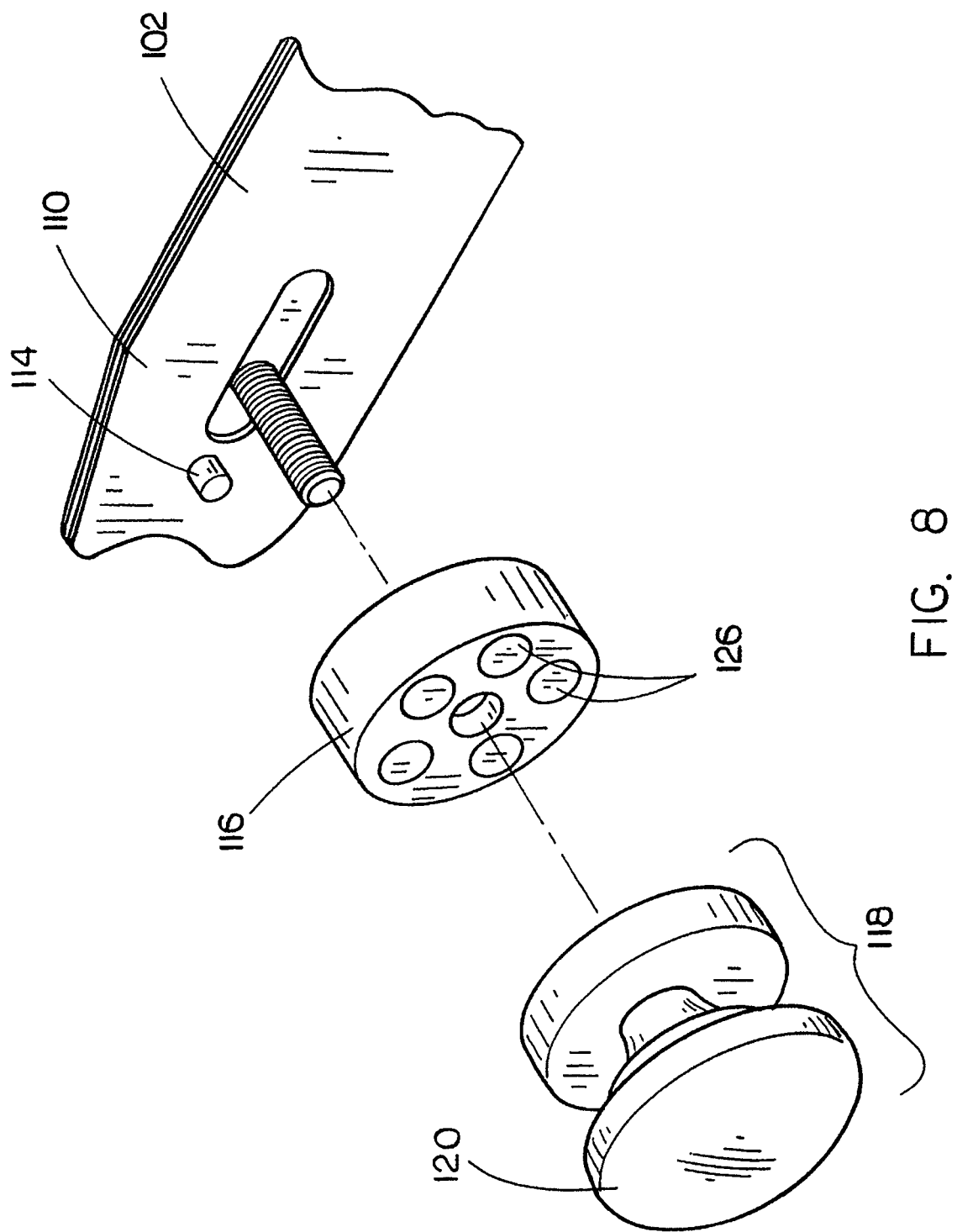
FIG. 8 is another partial exploded isometric view of the guide bar, the cam, and the clutch illustrated in FIG. 7.

In one specific embodiment, illustrated in FIGS. 1 through 6, the clutch 118 includes a wrap spring 122 between the knob 120 and the cam 116 to limit the amount of tension which may be supplied to the cutting chain 103. In another specific embodiment, illustrated in FIGS. 7 and 8, the clutch 118 includes a first series of magnets 124, and the cam 116 includes a generally opposed second series of magnets 126. The first and second series of magnets 124 and 126 hold the driven parts in relation to the driving parts until sufficient force is created such that the magnetic forces between the first and second series of magnets are no longer great enough to prevent a slip between the parts limiting the torque that the driven parts can apply. In a further embodiment, two friction surfaces may be utilized such that the surfaces will slip relative to one another when the resistance torque of the driven parts is greater than the torque of the friction surfaces.

Figure 9:
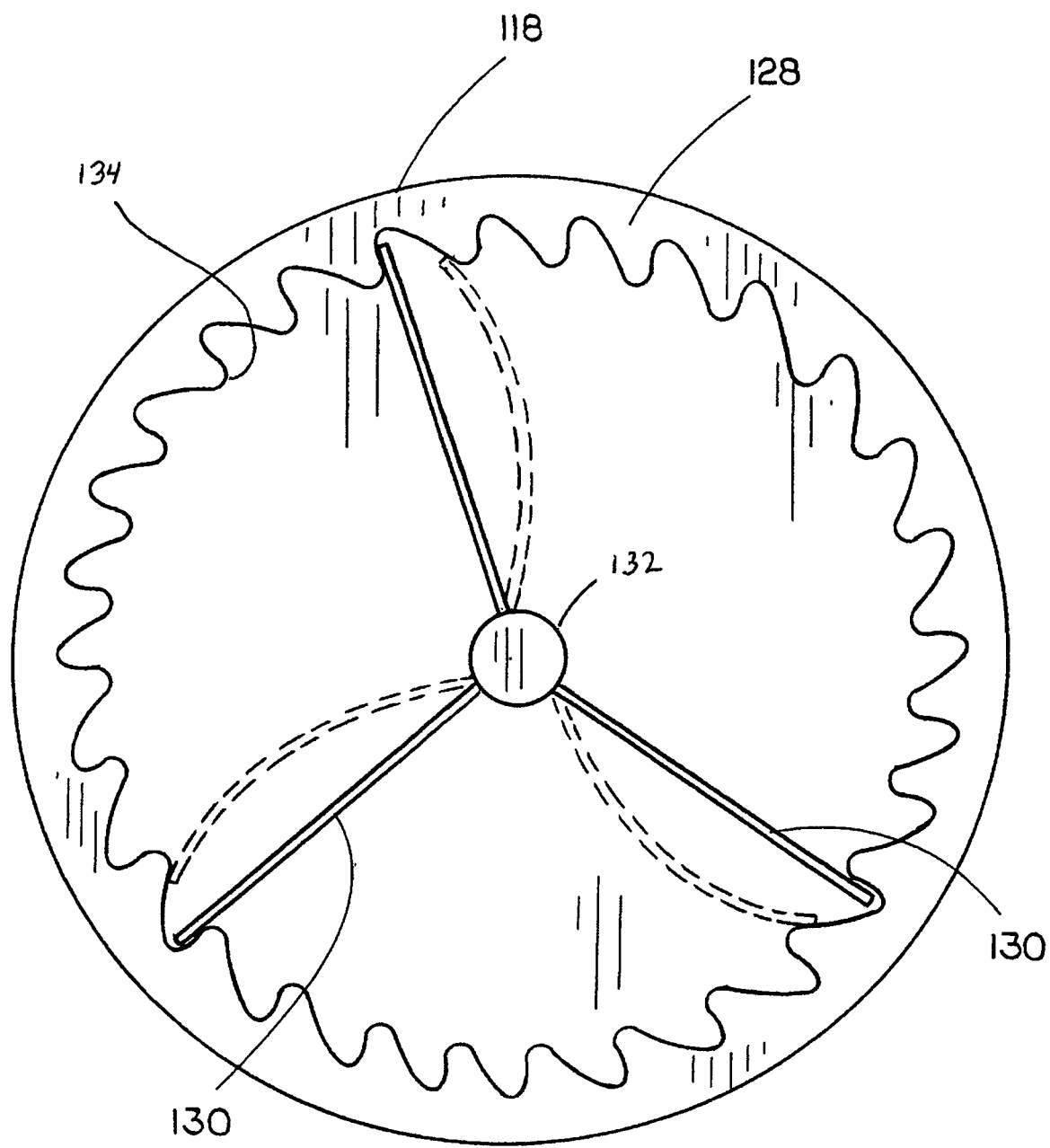
FIG. 9 is a plan view of a clutch.

In a still further embodiment, illustrated in FIG. 9, the clutch 118 includes a ring gear 128 rotated by the knob 120 and one or more flexible fingers 130 comprising a center gear 132 connected to the cam 116. However, one skilled in the art will realize that these components may be reversed such that the gear is connected to the cam, and the flexible fingers are connected to the handle without departing from the scope of the invention. In a specific embodiment, the fingers 130 may be constructed from a plastic material, such as Acrylonitrile Butadiene Styrene (ABS) or another type of plastic. The ring gear 128 may also be constructed from a plastic material. The ring gear 128 may include directioned teeth 134, providing slip torque between the ring gear 128 and the fingers 130 that is much higher in one direction than in an opposing direction. Thus, when a finger 130 bends past kick-over, the clutch 118 slips, stopping tensioning or tightening of the ring gear 128. Thus, the clutch 118 may comprise a torque-limited transmission.

While the present disclosure describes the wrap spring 122, the first series of magnets 124 and the generally opposed second series of magnets 126, the two friction surfaces, and the ring gear 128 and the fingers 130 with some specificity, it will be appreciated that these embodiments are not meant to be limiting of the present disclosure, and that other clutch mechanisms may be utilized with the torque-limiting chain tensioning device of the present disclosure.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A chainsaw powered by a motor housed by a chainsaw body, the chainsaw comprising:

a cutting chain operatively connected to and drivable by the motor;

a guide bar mounting stud extending from the chainsaw body;

a guide bar having a track for supporting the cutting chain around a periphery of the guide bar, an adjustment pin extending from a side face thereof, and an elongated slot formed therein, the guide bar mounting stud being slidingly receivable within said slot in the guide bar, wherein said guide bar is longitudinally adjustable relative to the chainsaw body;

a cam rotatably attached to the guide bar mounting stud and having an eccentric groove formed into a surface directed toward the guide bar, wherein the adjustment pin is received in the eccentric groove, wherein rotation of the cam causes the adjustment pin to slide within the eccentric groove, thereby causing longitudinal movement of the guide bar with respect to the chainsaw body; and a clutch operatively connected to the cam, wherein the clutch is slippable relative to the cam to prevent more than a predetermined load to be applied to the guide bar for tensioning the cutting chain.

2. The chainsaw of claim 1 wherein when there is not sufficient tension in the cutting chain, the cam is rotatable in response to rotation of the clutch which causes said sliding of the adjustment pin within the eccentric groove to longitudinally move the guide bar relative to the chainsaw body, and when sufficient tension exists in the cutting chain, the clutch will begin said slipping relative to said cam to prevent more than a predetermined load to be applied to the guide bar for tensioning the cutting chain.

3. The chainsaw of claim 2 wherein the clutch comprises a knob mounted on the guide bar mounting stud and rotatable about a longitudinal axis of the guide bar mounting stud.

4. The chainsaw of claim 2 wherein the clutch includes a wrap spring between the knob and the cam to limit an amount of the tension which may be supplied to the cutting chain.

5. The chainsaw of claim 2 wherein the clutch includes a first series of magnets, and the cam includes a generally opposed second series of magnets, wherein the first and second series of magnets hold the cam in relation to the clutch until sufficient rotational force is created such that magnetic forces between the first and second series of magnets are no longer great enough to prevent said slippage between the clutch and the cam.

6. The chainsaw of claim 2 wherein the clutch includes a ring gear connected to one of the clutch and the cam, and one or more flexible fingers comprising a center gear connected to the other of the clutch or the cam.

7. The chainsaw of claim 6 wherein the fingers are constructed from a plastic material.

8. The chainsaw of claim 6 wherein the ring gear includes directioned teeth, providing slip torque between the ring gear and the fingers that is greater when a knob is rotated in a first direction than that in an opposing direction.

9. The chainsaw of claim 6 wherein when a finger bends past kick-over, the clutch slips.

10. The chainsaw of claim 2 wherein said clutch includes a first series of magnets, and said cam includes a second series of magnets opposing said first series of magnets, wherein said first and second series of magnets maintain a connection between said clutch and said cam during rotation of said clutch, and when a resistive force from said adjustment of said tension in said cutting chain is greater than a magnetic force between said first and second series of magnets, said clutch slips relative to said cam to prevent said cutting chain from having more than a pre-determined tension therein.

11. A chainsaw powered by a motor housed by a chainsaw body, the chainsaw comprising:
- a guide bar mounting stud extending from said chainsaw body;
- a guide bar having an elongated slot formed therein for receiving said guide bar mounting stud, an adjustment pin extending from a side face thereof, and a track formed about the periphery thereof, said guide bar being longitudinally adjustable relative to said chainsaw body;
- a cutting chain at least partially positioned on said track of said guide bar, said cutting chain being drivable by the motor, wherein tension of said cutting chain is adjustable in response to longitudinal movement of said guide bar relative to said chainsaw body;
- a clutch rotatably connected to said guide bar mounting stud; and
- a cam rotatably connected to said guide bar mounting stud and positioned between said clutch and said guide bar, said cam having an eccentric groove formed into a surface adjacent to said guide bar, said adjustment pin being receivable and slidable within said eccentric groove;
- wherein rotation of said clutch causes said cam to rotate such that said adjustment pin slides within said eccentric groove to cause said guide bar to longitudinally move relative to said chainsaw body for adjusting said tension of said cutting chain, and wherein said clutch is slippable relative to said cam to prevent said cutting chain from having more than a predetermined tension therein.

* * * * *